United States Patent
Inoha

(10) Patent No.: US 6,889,327 B1
(45) Date of Patent: May 3, 2005

(54) COPYRIGHTED DIGITAL DATA MANAGEMENT METHOD, CONTENTS PROVIDER, USER TERMINAL, AND DATA RECORDING MEDIUM

(75) Inventor: Wataru Inoha, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 930 days.

(21) Appl. No.: 09/642,761

(22) Filed: Aug. 22, 2000

(30) Foreign Application Priority Data

Aug. 23, 1999 (JP) .......................... P11-235124

(51) Int. Cl.[7] .............................. G06F 12/14; H04L 9/00
(52) U.S. Cl. .................................... 713/193; 380/233
(58) Field of Search ........................ 713/193; 380/227, 380/230, 231, 233, 201; 705/51

(56) References Cited

U.S. PATENT DOCUMENTS 5,003,384 A    3/1991   Durden et al.
5,809,145 A  *  9/1998   Slik et al. .................. 705/52
6,301,660 B1 * 10/2001   Benson ....................... 713/165

FOREIGN PATENT DOCUMENTS

| EP | 0 450 841 A2 | 10/1991 |
|---|---|---|
| EP | 0 813 194 A2 | 12/1997 |
| JP | 09214929 | 8/1997 |
| JP | 10-257466 | 9/1998 |
| JP | 11149709 | 6/1999 |
| WO | 97/37492 A1 | 10/1997 |

* cited by examiner

Primary Examiner—Matthew Smithers
(74) Attorney, Agent, or Firm—Nath & Associates PLLC; Gary M. Nath; Marvin C. Berkowitz

(57) ABSTRACT

After a user terminal executes a data usage accounting procedure for a contents provider, enciphered copyrighted digital data generated by enciphering chargeable copyrighted digital data using encryption key data, digital sample preview data generated from an outline of the copyrighted digital data at a non-chargeable level without enciphering, decryption key data for deciphering the enciphered copyrighted digital data, and additional data required for accounting are transmitted from the contents provider to the user terminal over a network.

5 Claims, 7 Drawing Sheets

COPYRIGHTED DIGITAL DATA MANAGEMENT METHOD, CONTENTS PROVIDER, USER TERMINAL, AND DATA RECORDING MEDIUM

BACKGROUND OF THE INVENTION

1. Field of the Invention

The present invention relates to a copyrighted digital data management method, a contents provider, a user terminal, and a data-recording medium for managing copyrights during the use, storage, copy, and transfer of copyrighted digital data such as video, sound, and computer software.

2. Description of the Related Art

As the digital data age has arrived, various systems for providing the user with copyrighted digital data, such as video, sound, and computer software, over the Internet have been developed.

For example, in the cable broadcasting transmission system and method disclosed in Japanese Patent Laid-Open Publication No. Hei 10-257466, a data provider sends preview video before the user is going to select video data to be played back so that the user can examine the content before agreeing to pay for it.

FIG. 1 is a diagram showing the configuration of a cable broadcasting transmission system and method in the prior art.

The conventional cable broadcasting transmission system and method in FIG. 1, disclosed in Japanese Patent Laid-Open Publication No. Hei 10-257466, will be outlined below.

A data transmission central station 101 comprises a transmitter/receiver 201, a control command processor 202, an accounting manager 203, a stream data generator 204, a video data storage unit 205, and an index data storage unit 206. The video data storage unit 205 and the index data storage unit 206 respectively store therein video data and index data compressed according to the MPEG (Moving Picture Experts Group) standard. The video data and index data are digital.

In response to a playback request for video data from the user, the data transmission central station 101 reads required (requested) data from the video data storage unit 205 and generates a video stream for preview via the stream data generator 204. More specifically, the stream data generator 204 references the data stored in the index data storage unit 206, reads only the I frames (Intra-frames) from the video data storage unit 205 beginning at the start of the content for use in preview to generate a preview video stream, and sends the preview video stream to the user terminal via the transmitter/receiver 201.

After that, the user views the preview video stream displayed on the terminal and, if that video data is the one the user wants to view, sends a message, indicating that the user agrees to pay for it, to the data transmission central station 101. Upon receiving this agreement message, the data transmission central station 101 reads all video data from the start and sends the full video stream to the user terminal.

In the conventional cable broadcasting transmission system and method described above, the full video stream corresponding to the preview video stream is sent from the data transmission central station 101 after the user views the preview and sends an agreement message to the data transmission central station 101. This gives the user a chance to record the full video stream onto a data recording medium attached to the terminal for later playback.

Because the full video stream is digital data and therefore the quality is not degraded by repeated copy or transfer operations, there is a possibility that the user will make an illegal copy of the video stream and transfer it to other users.

To avoid this illegal copy or transfer, copyrighted digital data, which is transferred from a contents provider (data provider) to the user's data terminal via the Internet, is encrypted with encryption key data. This method allows only the user, who agrees to pay for digital data, to decipher the copyrighted digital data.

SUMMARY OF THE INVENTION

When cryptographic technology is applied to the conventional cable broadcasting transmission system, the first-level user who has agreed to pay for enciphered copyrighted digital data can, of course, decipher it. However, there is no system which allows a legal copy to be transferred from the first-level user to the second-level user, from the second-level user to the third-level user, . . . , and from the (N−1)th-level user to the Nth-level user and which can send both enciphered copyrighted digital data and preview video stream to the second-level, third-level, . . . (N−1)th-level, and Nth-level users.

Neither is there a system which can efficiently send both a preview video stream and enciphered copyrighted digital data when transferring direct mail advertisement to a large number of users over the Internet.

To solve the above problems, there is provided a copyrighted digital data management method wherein, after a user terminal executes a data usage accounting procedure for a contents provider, enciphered copyrighted digital data generated by enciphering chargeable copyrighted digital data using encryption key data, digital sample preview data generated from an outline of the copyrighted digital data at a non-chargeable level without enciphering, decryption key data for deciphering the enciphered copyrighted digital data, and additional data required for accounting are transmitted from the contents provider to the user terminal over a network.

In a preferred embodiment of the present invention, the user terminal is allowed to reproduce the digital sample preview data but, to reproduce the enciphered copyrighted digital data, is required to decipher the enciphered copyrighted digital data with the decryption key data.

Furthermore, to solve the above problems, there is provided a copyrighted digital data management method wherein, after a first user terminal executes a data usage accounting procedure for a contents provider, enciphered copyrighted digital data generated by enciphering chargeable copyrighted digital data using encryption key data, digital sample preview data generated from an outline of the copyrighted digital data at a non-chargeable level without enciphering, decryption key data for deciphering the enciphered copyrighted digital data, and additional data required for accounting are transmitted from the contents provider to the first user terminal over a network and recorded on a data recording medium in the first user terminal, and wherein, when the data recorded on the data recording medium in the first user terminal is copied to a data recording medium in a second user terminal over the network, the enciphered copyrighted digital data, the digital sample preview data, and the additional data are transmitted from the first user terminal to the second user terminal over the network or a leased line.

In a preferred embodiment of the present invention, the first user terminal does not transmit the decryption key data to the second user terminal.

In a preferred embodiment of the present invention, after the second user terminal executes the data usage accounting procedure for the contents provider, the contents provider transmits the decryption key data for deciphering the enciphered copyrighted digital data to the second user terminal over the network.

In a preferred embodiment of the present invention, the first user terminal is allowed to reproduce the digital sample preview data but, to reproduce the enciphered copyrighted digital data, is required to decipher the enciphered copyrighted digital data with the decryption key data, and the second user terminal is allowed to reproduce the digital sample preview data but, to reproduce the enciphered copyrighted digital data, is required to obtain the decryption key data from the contents provider and then decipher the enciphered copyrighted digital data with the decryption key data.

To solve the above problems, there is provided a copyrighted digital data management method wherein enciphered copyrighted digital data generated by enciphering chargeable copyrighted digital data using encryption key data, digital sample preview data generated from an outline of the copyrighted digital data at a non-chargeable level without enciphering, and additional data required for accounting are transmitted from a contents provider to at least one user terminal over a network.

In a preferred embodiment of the present invention, after the user terminal executes a data usage accounting procedure for the contents provider, the contents provider transmits decryption key data for deciphering the enciphered copyrighted digital data to the user terminal over the network.

In a preferred embodiment of the present invention, the user terminal is allowed to reproduce the digital sample preview data but, to reproduce the enciphered copyrighted digital data, is required to obtain the decryption key data from the contents provider and then decipher the enciphered copyrighted digital data with the decryption key data.

To solve the above problems, there is provided a contents provider comprising receiving means for receiving a data usage accounting procedure from a user terminal; and transmitting means for transmitting enciphered copyrighted digital data generated by enciphering chargeable copyrighted digital data using encryption key data, digital sample preview data generated from an outline of the copyrighted digital data at a non-chargeable level without enciphering, decryption key data for deciphering the enciphered copyrighted digital data, and additional data required for accounting to the user terminal over a network, the data being all transmitted when the data usage accounting procedure is received from the user terminal.

Furthermore, to solve the above problems, there is provided a contents provider comprising transmitting means for transmitting enciphered copyrighted digital data generated by enciphering chargeable copyrighted digital data using encryption key data, digital sample preview data generated from an outline of the copyrighted digital data at a non-chargeable level without enciphering, and additional data required for accounting, to at least one user terminal over a network.

In a preferred embodiment of the present invention, the contents provider further comprises receiving means for receiving a data usage accounting procedure from the user terminal, and, when the accounting procedure is received from the user terminal, the transmitting means transmits decryption key data for deciphering the enciphered copyrighted digital data to the user terminal over the network.

To solve the above problems, there is provided a user terminal comprising transmitting means for transmitting a data usage accounting procedure to a contents provider; receiving means for receiving enciphered copyrighted digital data generated by enciphering chargeable copyrighted digital data using encryption key data, digital sample preview data generated from an outline of the copyrighted digital data at a non-chargeable level without enciphering, decryption key data for deciphering the enciphered copyrighted digital data, and additional data required for accounting, from the contents provider over a network after the accounting procedure is executed for the contents provider; recording means for recording in a data recording means the enciphered copyrighted digital data, digital sample preview data, decryption key data, and additional data received by the receiving means; reproducing means for reproducing the digital sample preview data recorded in the data recording means; and deciphering means for deciphering the enciphered copyrighted digital data recorded in the data recording means.

In a preferred embodiment of the present invention, out of the data recorded in the data recording medium, the enciphered copyrighted digital data, digital sample preview data, and additional data may be copied to other user terminals.

To solve the above problems, there is provided a user terminal comprising receiving means for receiving enciphered copyrighted digital data generated by enciphering chargeable copyrighted digital data using encryption key data, digital sample preview data generated from an outline of the copyrighted digital data at a non-chargeable level without enciphering, and additional data required for accounting, from a contents provider over a network; recording means for recording the enciphered copyrighted digital data, the digital sample preview data, and the additional data in a data recording means; reproducing means for reproducing the digital sample preview data recorded in the data recording means; transmitting means for transmitting a data usage accounting procedure to the contents provider; and deciphering means for deciphering the copyrighted digital data using decryption key data after the transmitting means transmits the accounting procedure to the contents provider and, in response, the receiving means receives from the contents provider the decryption key data for deciphering the enciphered copyrighted digital data over the network.

To solve the above problems, there is provided a data recording medium recording therein enciphered copyrighted digital data generated by enciphering chargeable copyrighted digital data using encryption key data, digital sample preview data generated from an outline of the copyrighted digital data at a non-chargeable level without enciphering, decryption key data for deciphering the enciphered copyrighted digital data, and additional data required for accounting.

To solve the above problems, there is provided a data recording medium recording therein enciphered copyrighted digital data generated by enciphering chargeable copyrighted digital data using encryption key data, digital sample preview data generated from an outline of the copyrighted digital data at a non-chargeable level without enciphering, and additional data required for accounting.

The nature, principle and utility of the invention will become more apparent from the following detailed description when read in conjunction with the accompanying drawings.

DESCRIPTION OF THE PREFERRED EMBODIMENTS

One embodiment of a copyrighted digital data management method, a contents provider, a user terminal, and a data-recording medium according to the present invention will be described in detail below with reference to FIGS. 2 to 6.

Figure 1:
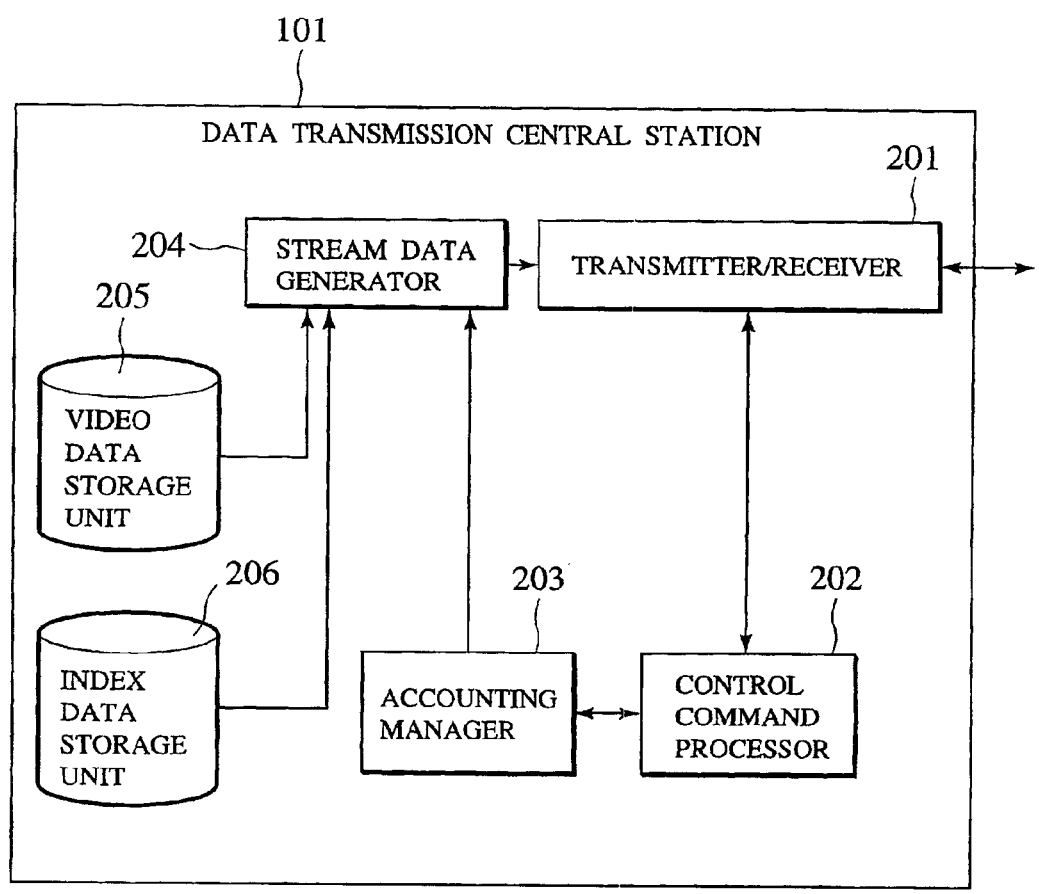
FIG. 1 is a configuration diagram showing a cable broadcasting transmission system and method in the prior art.
Figure 2:
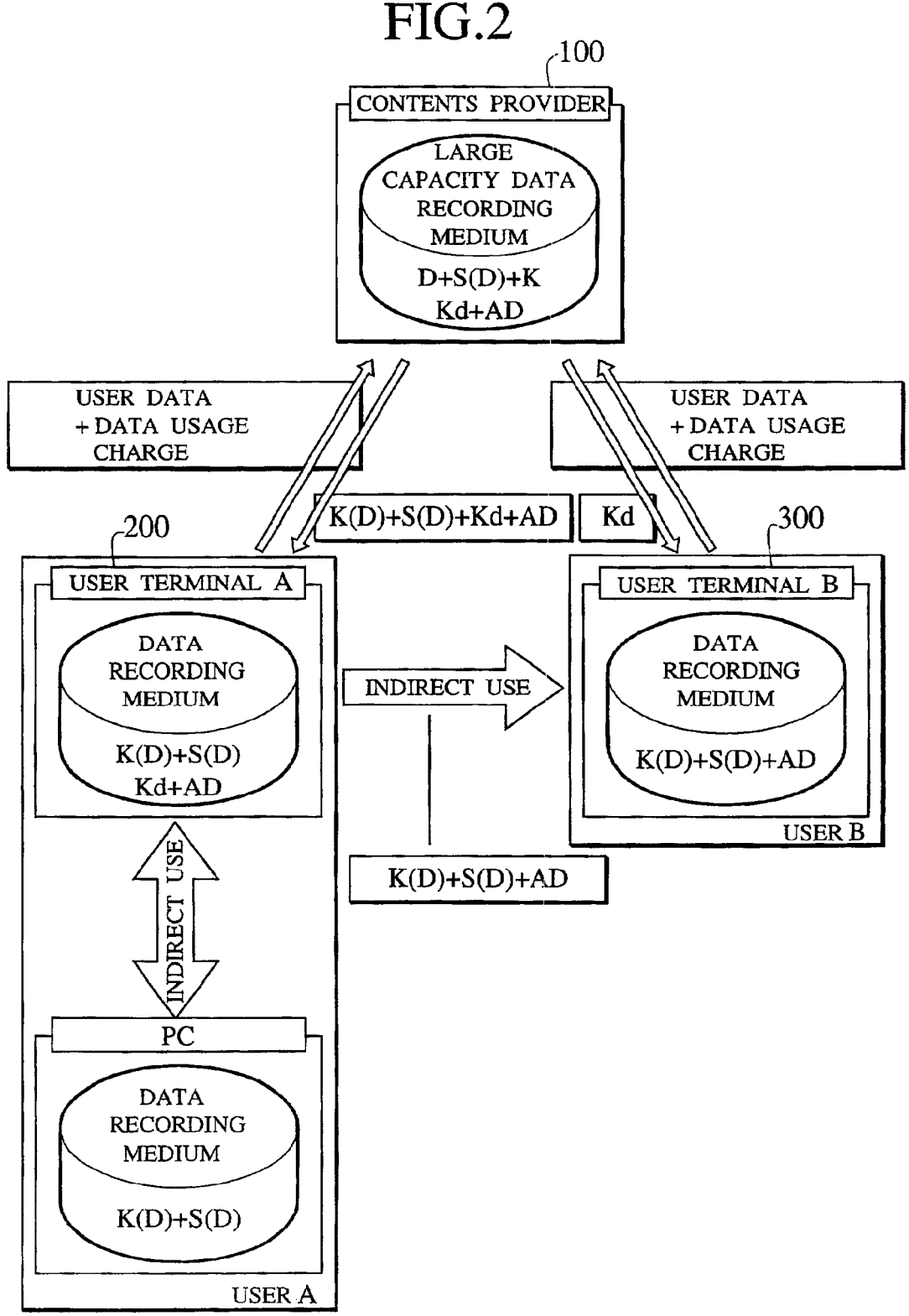
FIG. 2 is a diagram conceptually showing a copyrighted digital data management method, a contents provider, user terminals, and data recording media according to the present invention.

Referring to FIG. 2, a contents provider 100 which is a data provider, user terminal A 200 which is a first-level user terminal of digital data provided by the contents provider, and user terminal B 300 which is a second-level user terminal using data copied from user terminal A 200 are related in the copyrighted digital data management method according to the present invention as shown in the figure. It is assumed that copyrighted digital data is sent or received over a network, especially, over the Internet.

First, user terminal A 200, a first-level user terminal which uses first-level copyrighted digital data provided by the contents provider, will be described.

In FIG. 2, a large-capacity recording medium installed in the contents provider stores therein copyrighted digital data D which is copyrighted and chargeable, digital sample preview data S(D) generated, without deciphering, at non-chargeable level by obtaining a non-chargeable amount of copyrighted digital data D or by degrading copyrighted digital data D to a non-chargeable level, unique encryption key data K which is used to encipher the copyrighted digital data D, decryption key data Kd which is used to decipher the copyrighted digital data D, and additional data AD which contains accounting data required for using copyrighted digital data D and usage condition data. The copyrighted digital data D includes image data, sound data, computer software, and so on. The additional data AD may be included in the digital sample data S(D).

Upon receiving a usage request from user terminal A, the contents provider executes the accounting procedure required for using data based on user data, checks if user terminal A is allowed to use data and, if allowed, terminates the accounting procedure for user terminal A. Then, the contents provider reads the required copyrighted digital data D and the unique encryption key data K from the large-capacity recording medium and enciphers the copyrighted digital data D using the unique encryption key data K to generate enciphered copyrighted digital data K(D). At the same time, the contents provider reads the digital sample preview data S(D), decryption key data Kd, and additional data AD.

After that, the contents provider sends the enciphered copyrighted digital data K(D) obtained from enciphering, digital sample preview data S(D), decryption key data Kd required for deciphering the enciphered copyrighted digital data K(D), and additional data AD to user terminal A over the network. At this time, the decryption key data Kd required for deciphering may be enciphered using, for example, the user data (ID data) on user terminal A before sending the above data.

User terminal A 200 receives from the contents provider 100 the enciphered copyrighted digital data K(D), digital sample preview data S(D), decryption key data Kd for deciphering the enciphered copyrighted digital data K(D), and additional data AD including the required accounting data and usage conditions, and records the received data on the data recording medium in user terminal A. At this time, the decryption key data Kd is recorded basically in an area, not intentionally accessible to the general user, in the data recording medium in user terminal A. The digital sample preview data S(D) and the additional data AD are recorded on the data recording medium so that they may be reproduced first.

To use the enciphered copyrighted digital data K(D) recorded on the data recording medium in user terminal A, the user must decipher the enciphered copyrighted digital data K(D) using the decryption key data Kd recorded at the same time. Of course, the digital sample preview data S(D) recorded on the data recording medium may be viewed on user terminal A to examine the outline of the enciphered copyrighted digital data K(D). The additional data AD recorded on the data recording medium in user terminal A may be used, as necessary, by user terminal A which is a first-level user terminal. This additional data AD is used primarily when data is provided to user terminal B which is a second-level user.

Next, user terminal B 300 will be described. User terminal B 300 is a second-level user terminal which indirectly uses copyrighted digital data via user terminal A which directly uses copyrighted digital data provided by the contents provider.

While user terminal A is a first-level user terminal which receives copyrighted digital data directly from the contents provider according to the regular procedure, user terminal B is a second-level user terminal which copies the copyrighted digital data from user terminal A for indirect use.

User terminal A and user terminal B may be connected via a network or a leased (private) line. User terminal B is able to copy copyrighted digital data owned by user terminal A. It should be noted that, at this time, the decryption key data Kd for deciphering the enciphered copyrighted digital data K(D) recorded on the data recording medium in user terminal A is not output to user terminal B. From user terminal A, only the enciphered copyrighted digital data K(D), digital sample preview data S(D), and additional data AD including required accounting data and usage conditions are sent to user terminal B as copy data. These are copied onto the data-recording medium in user terminal B.

User terminal B, a second-level user terminal, may copy the enciphered copyrighted digital data K(D), digital sample preview data S(D), and additional data AD including required accounting data and usage conditions from the user terminal A, a first-level user terminal. However, out of the copied data, user terminal B may try only the digital sample preview data S(D) as a sample. When the user at user terminal B previews the digital sample preview data S(D) and wants to view the enciphered copyrighted digital data K(D), he or she must check the additional data AD or the digital sample preview data S(D) containing the additional data AD to find the accounting contents provider. For the accounting contents provider, user terminal B executes the regular usage procedure to obtain only the decryption key data Kd that will be used to decipher the enciphered copyrighted digital data K(D). This decryption key data Kd, obtained from the contents provider, enables user terminal B to decipher the enciphered copyrighted digital data K(D).

Next, the indirect use of copyrighted digital data executed by user terminal A will be described. In the description below, assume that the enciphered copyrighted digital data K(D), digital sample preview data S(D), decryption key data Kd used to decipher the enciphered copyrighted digital data K(D), and additional data AD including the required accounting data and usage conditions are already obtained from the contents provider according to the regular procedure and recorded in the recording medium in user terminal A. In this state, when moving the data from the recording medium to a large-capacity data recording medium (for example, a hard disk, optical disc) in the same terminal, only the enciphered copyrighted digital data K(D) and the digital sample preview data S(D) are moved. And, out of the enciphered copyrighted digital data K(D) and the digital sample preview data S(D) that have been moved to the hard disk or the optical disc in the same terminal, user terminal A may use only the digital sample preview data S(D). This digital sample preview data S(D) may be used to manage the copyrighted digital data.

The decryption key data Kd which was not moved to the large-capacity data recording medium is stored in a memory in user terminal A where data unique to user terminal A is stored.

When the copyrighted digital data stored and managed on the hard disk or the optical disc is returned to the data recording medium, the decryption key data Kd corresponding to the enciphered copyrighted digital data K(D) is read from the memory to decipher the enciphered copyrighted digital data K(D) for late use.

Furthermore, the contents provider may be provided with a recorder/reproducer and a recording medium with which associated user data, such as the user terminal A accounting data and usage data, is managed. This capability allows the enciphered copyrighted digital data K(D) to be used by simply obtaining the decryption key data Kd, thus eliminating the need for downloading the accounting data and all copyrighted digital data even when the decryption key data Kd is erased from the memory of user terminal A.

The user who owns user terminal A may copy the copyrighted digital data to a terminal other than user terminal A in the same way the copyrighted digital data is copied to user terminal B. When copying the copyrighted digital data from user terminal B to user terminal C, from user terminal C to user terminal D, . . . , from user terminal (N−1) to user terminal N, the enciphered copyrighted digital data K(D), digital sample preview data S(D), and additional data AD may be copied. The decryption key data Kd used to decipher the enciphered copyrighted digital data K(D) should be obtained by finding the accounting contents provider.

Figure 3:
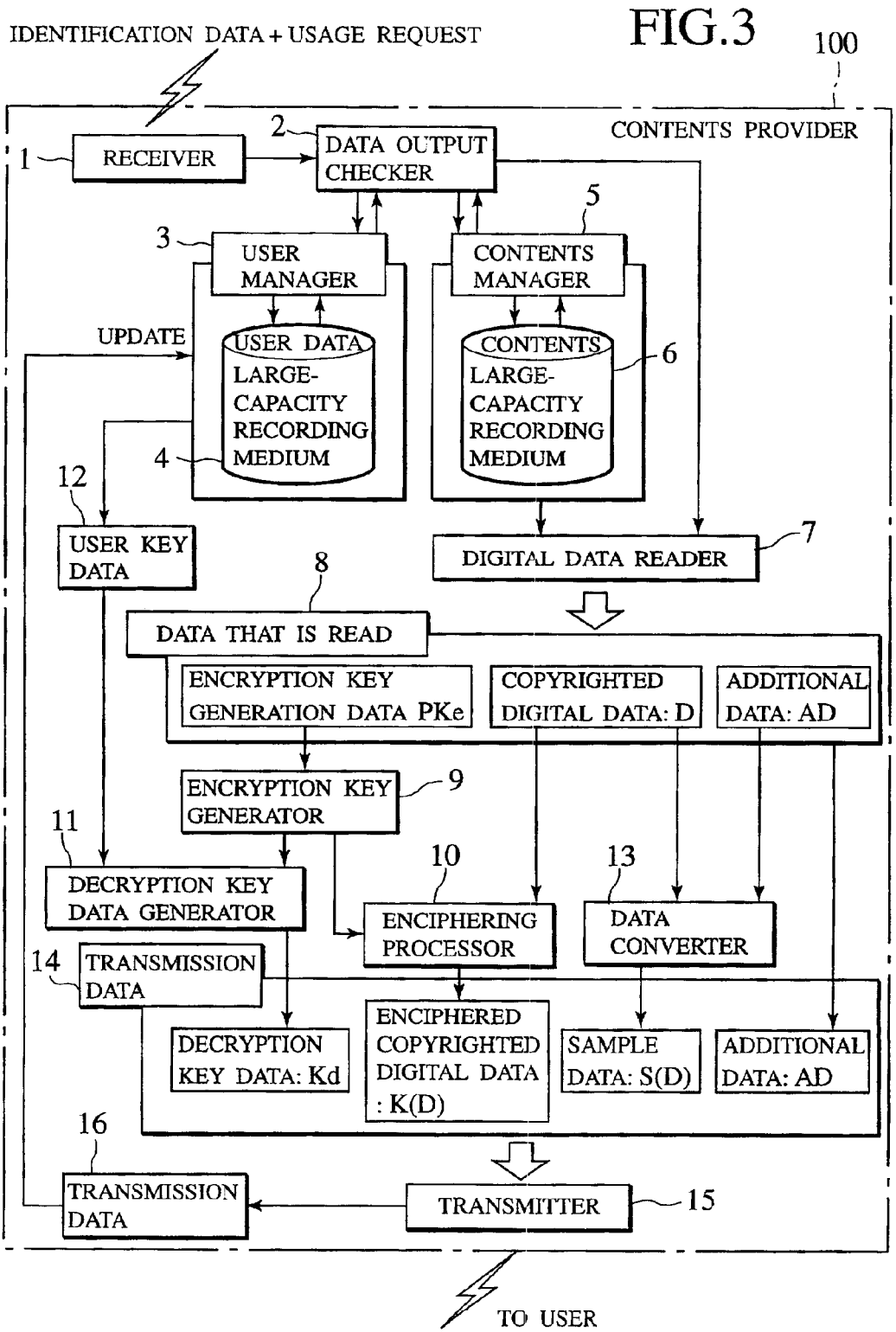
FIG. 3 is a diagram showing the configuration of the contents provider.

Next, an example of the contents provider described above will be described with reference to FIG. 3. As shown in FIG. 3, a contents provider 100 comprises a receiver 1 receiving data from a user terminal over a network (line), a data output checker 2 checking whether or not the copyrighted digital data D requested by a user terminal is to be output, a user manager 3 storing therein user data for management, a large-capacity recording medium 4 for recording user data therein, a contents manager 5 storing therein and managing copyrighted digital data D, encryption key generation data PKe unique to the copyrighted digital data D, and additional data AD, a large-capacity recording medium 6 for storing contents therein, a digital data reader 7 reading copyrighted digital data from the large-capacity content-storing recording medium 6 based on the checking result of the data output checker 2, an encryption key generator 9 generating encryption key data K on copyrighted digital data D based on the encryption key generation data PKe, an enciphering processor 10 enciphering copyrighted digital data D using the generated encryption key data K to generate enciphered copyrighted digital data K(D), a decryption key data generator 11 generating a decryption key data Kd that will be used to decipher the enciphered copyrighted digital data K(D), a data converter 13 converting, without enciphering, an outline to non-chargeable digital sample preview data S(D) by obtaining a non-chargeable amount of the copyrighted digital data D or by degrading the copyrighted digital data D to a non-chargeable level, and a transmitter 15 transmitting the digital data (transmission data 24) to an user terminal at a time.

The contents provider 100, a data provider, has MPEG2-coded copyrighted video data stored in the large-capacity recording medium 6. In addition, unique encryption key generation data PKe and the additional data AD composed of condition data for generating non-chargeable data from an MPEG2 stream of video data and accounting data necessary for using copyrighted digital data are attached to each piece of video data and are stored also in the large-capacity recording medium 6.

First, the receiver 1 receives a contents usage request and unique identification data (ID data) for identifying the user terminal from a user terminal. Based on the user data received by the receiver 1, the data output checker 2 checks if the requested contents may be output. This checking is made based on the data usage limit data included in the user data pre-stored in the large-capacity recording medium 4 managed by user manager 3 and the contents value data recorded in the large-capacity recording medium 6 managed by the content manager 5. If the numeric value of the limit the user terminal may use is larger than the numeric value of the contents value data, the data output checker 2 allows the digital data reader 7 to read the contents from the large-capacity recording medium 6. If the numeric value of the limit is smaller than the numeric value of the contents value data but if the contents provider is able to charge the user terminal properly, the data output checker 2 also allows the digital data reader 7 to read the contents.

Digital data 8 read by the digital data reader 7 comprises the encryption key generation data PKe, copyrighted digital data D, and additional data AD.

Based on the encryption key generation data PKe, the encryption key generator 9 generates unique encryption key data K used to encipher the copyrighted digital data D. It is to be understood that the copyrighted digital data D is enciphered using DES (Data Encryption Standard), one of block cipher methods, and therefore the encryption key data K generated by the encryption key generator 9 is 64 bits long. The enciphering processor 10 uses the encryption key data K to encipher, via DES, the MPEG2 stream of copyrighted digital data D, a 64-bit block at a time.

In general, the encryption key data K and the decryption key data Kd used for DES enciphering processing are the same or complementary. Therefore, the decryption key data generator 11 performs conversion processing or enciphering processing based on the encryption key data K and user key data 12 unique to each user terminal to generate the decryption key data Kd.

The data converter 13 increases the compression ratio of the MPEG data of the copyrighted digital data D to generate non-chargeable digital sample preview data S(D) set up by the copyright owner or contents provider. This digital sample preview data S(D) is used for preview.

Thus, transmission data 14 comprises the decryption key data Kd, enciphered copyrighted digital data K(D), digital sample preview data S(D), and additional data AD. This transmission data is sent from the transmitter 15 to a user terminal (for example, user terminal A), which is a first-level user terminal, over the telephone line, Internet, or broadcasting satellite.

After transmitting the digital data (transmission data 14), the transmitter 15 outputs transmission data 16 to the user manager 3. Based on this transmission data 16, the user manager 3 updates the data usage limit data and the data output history data of the user data stored in the large-capacity recording medium 4.

Next, a user terminal A 200, a first user terminal of the copyrighted digital data D provided by the contents provider 100, will be described with reference to FIG. 4.

Figure 4:
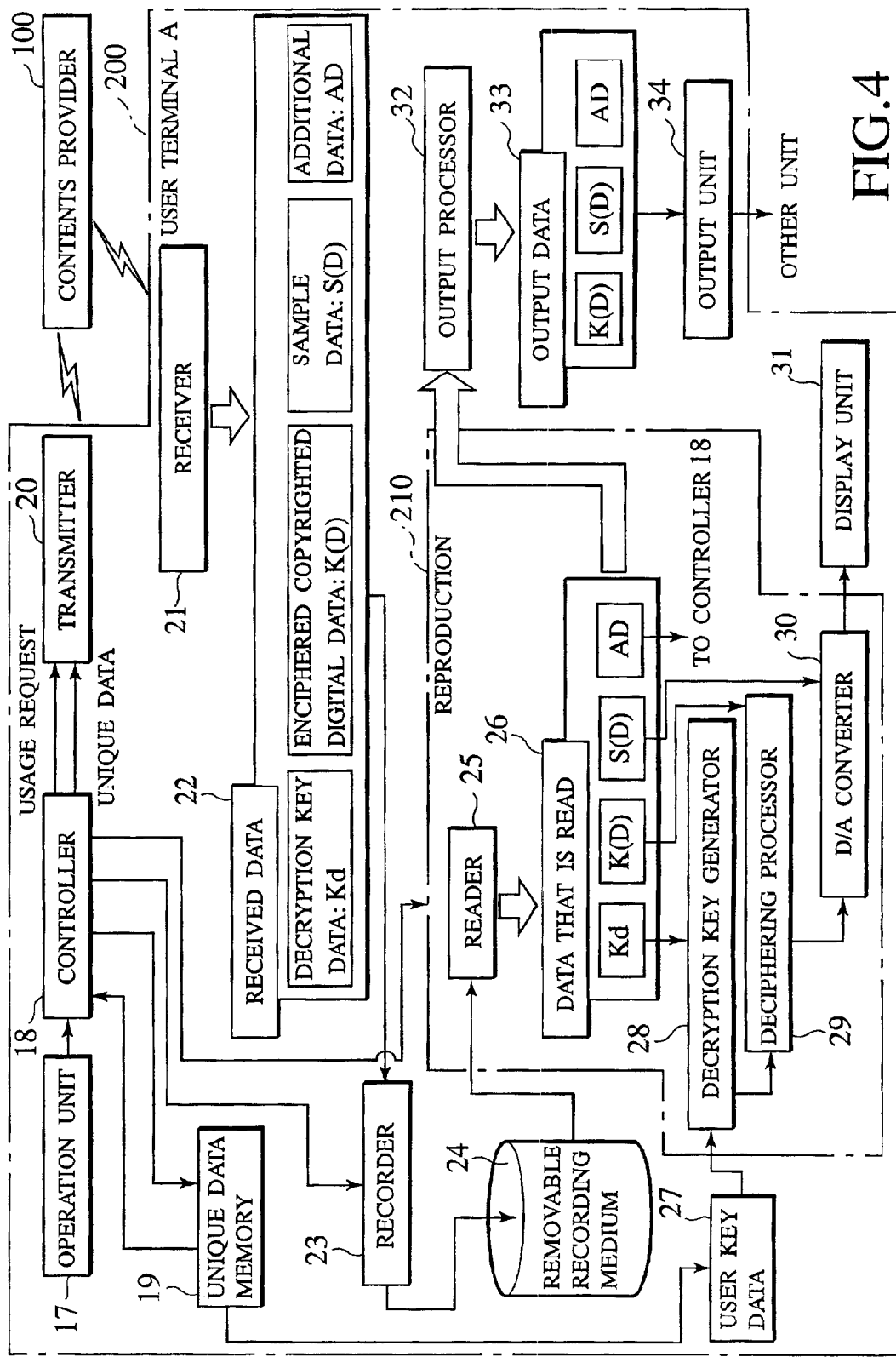
FIG. 4 is a diagram showing the configuration of user terminal A which is a first-level user terminal of copyrighted digital data provided by the contents provider.

As shown in FIG. 4, the user terminal A 200 comprises an operation unit 17 used by the user to operate the terminal, a controller 18 controlling the terminal, a unique data memory 19 storing therein identification data unique to the terminal, a transmitter 20 transmitting a contents usage request, a data usage accounting procedure, and user data to the contents provider 100, a receiver 21 receiving digital data from the contents provider 100, a removable recording medium 24 used for recording the received digital data, a recorder 23 recording the digital data on the removable recording medium 24, a reader 25 reading the digital data from the removable recording medium 24, a decryption key generator 28 generating the decryption key data Kd of the enciphered copyrighted digital data K(D) from the data that is read, a deciphering processor 29 deciphering the enciphered copyrighted digital data K(D) using the generated decryption key data Kd, a D/A converter 30 D/A-converting the deciphered copyrighted digital data D, a display unit 31 displaying the converted copyrighted data, an output processor 32 outputting the digital data that is read including the enciphered copyrighted digital data K(D), digital sample preview data S(D), and additional data AD, but not including the decryption key data Kd, to an output unit 34, and an output unit 34 outputting digital data 33 to other data recording/reproduction terminals.

In response to a request from the operation unit 17, the controller 18 outputs a usage request, as well as unique data read from the unique data memory 19, to the transmitter 20. The transmitter 20 sends them to the contents provider 100.

The receiver 21 receives digital data from the contents provider 100. Received digital data 22 comprises the enciphered copyrighted digital data K(D), decryption key data Kd used to decipher the enciphered copyrighted digital data K(D), digital sample preview data S(D) generated by obtaining a non-chargeable amount of copyrighted digital data D or by degrading copyrighted digital data D to a non-chargeable level, and additional data AD including required accounting data and usage conditions.

The received digital data 22 is recorded once on the removable recording medium 24 by the recorder 23.

The digital data recorded on the removable recording medium 24 is read by the reader 25 at reproduction time. The digital data 26 that is read comprises the decryption key data Kd, enciphered copyrighted digital data K(D), digital sample preview data S(D), and additional data AD.

Based on user key data 27 that is read from the unique data memory 19, the decryption key generator 28 generates the decryption key data Kd for use in deciphering the enciphered copyrighted digital data K(D). This generation is the reverse processing of the decryption key data generator 11 shown in FIG. 3. That is, if replacement was done, reverse-replacement is performed based on the user key data 27.

The deciphering processor 29 deciphers the enciphered copyrighted digital data K(D) using the decryption key data Kd generated by the decryption key generator 28. If enciphering was done using the DES enciphering method, deciphering is done by reversing the method.

The deciphered copyrighted digital data D is converted by the D/A converter 30 from digital signals to analog signals which are output to the display unit 31.

The display unit 31 is a monitor when the copyrighted data is video, and a speaker when the copyrighted data is sound. Similarly, the digital sample data S(D) may be converted by the D/A converter to analog signals for display on the display unit 31.

The additional data AD includes usage condition data. The controller 18 controls the terminal based on this data.

On the other hand, when the user terminal A 200 performs indirect use of the data to copy the received digital data 22, obtained from the contents provider 100, to the recording medium of some other unit or terminal, the output processor 32 outputs the output digital data 33 to the output unit 34. This output digital data 33 comprises the enciphered copyrighted digital data K(D), digital sample preview data S(D), and additional data AD that are included in the reproduced digital data 26 read from the removable recording medium 24 by the reader 25. The output unit 34 outputs the output digital data 33 to other units or terminals over the network or the leased line.

Figure 5:
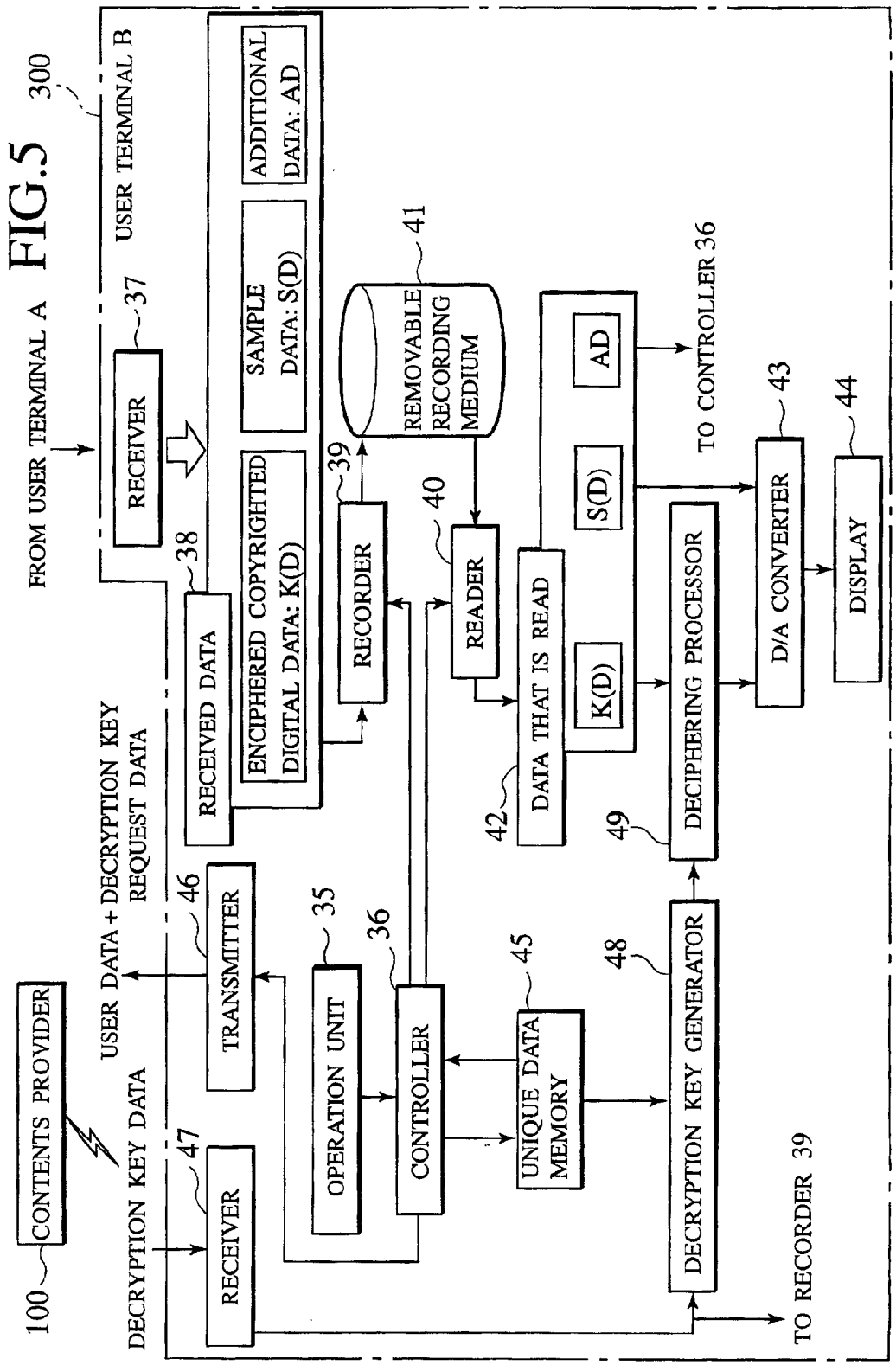
FIG. 5 is a diagram showing the configuration of user terminal B, which is a second-level user terminal indirectly using copyrighted digital data via user terminal A which is a first-level user terminal.

Next, user terminal B 300 will be described with reference to FIG. 5. The user terminal B 300 is a second-level user terminal which indirectly uses copyrighted digital data via the user terminal A 200, a first-level user terminal receiving copyrighted digital data from the contents provider 100.

The user terminal B 300 receives digital data, output from the output unit 34 in the user terminal A 200, via a receiver 37 over the network or the leased line.

Received data 38 comprises the enciphered copyrighted digital data K(D), digital sample preview data S(D), and additional data AD. This data is once recorded on a removable recording medium 41 by a recorder 39.

When reading digital data from the removable recording medium 41, reproduced digital data 42 read by a reader 40 comprises the enciphered copyrighted digital data K(D), digital sample preview data S(D), and additional data AD. Out of them, the user terminal B 300 may use only the digital sample preview data S(D) and the additional data AD.

The digital sample preview data S(D) and the additional data AD are converted by a D/A converter 43 from digital signals to analog signals and is displayed on a display 44.

Based on the digital sample preview data S(D) displayed on the display 44, the user at the user terminal B 300 decides whether the enciphered copyrighted digital data K(D) is necessary. Then, the user may obtain the decryption key data Kd of the enciphered copyrighted digital data K(D), which is available for a charge, from the contents provider 100.

To obtain the decryption key data Kd, a controller 36 transmits decryption key request data entered from an operation unit 35 and user identification data read from a unique data memory 45 to the contents provider 100 via a transmitter 46. The data is sent over the telephone line, Internet, or leased line.

The contents provider 100 checks the user terminal B 300 if the terminal will pay for the data. If it is determined that the decryption key data Kd may be sent to the terminal, the contents provider sends the decryption key data Kd over the telephone line, Internet, satellite line, or leased line. The user terminal B 300 receives the decryption key data Kd via a receiver 47.

A decryption key generator 48 generates a decryption key from the decryption key data Kd received by the receiver 47 and user key data stored in the unique data memory 45. The generated decryption key is recorded by the recorder 39 into the removable recording medium 41. Also, the generated decryption key is output to a deciphering processor 49 for use in deciphering the enciphered copyrighted digital data K(D).

The copyrighted digital data D deciphered by the deciphering processor 49 is converted by the D/A converter 43 from digital signals to analog signals and is output on the display 44. The display 44 outputs the data as video or sound.

Figure 6:
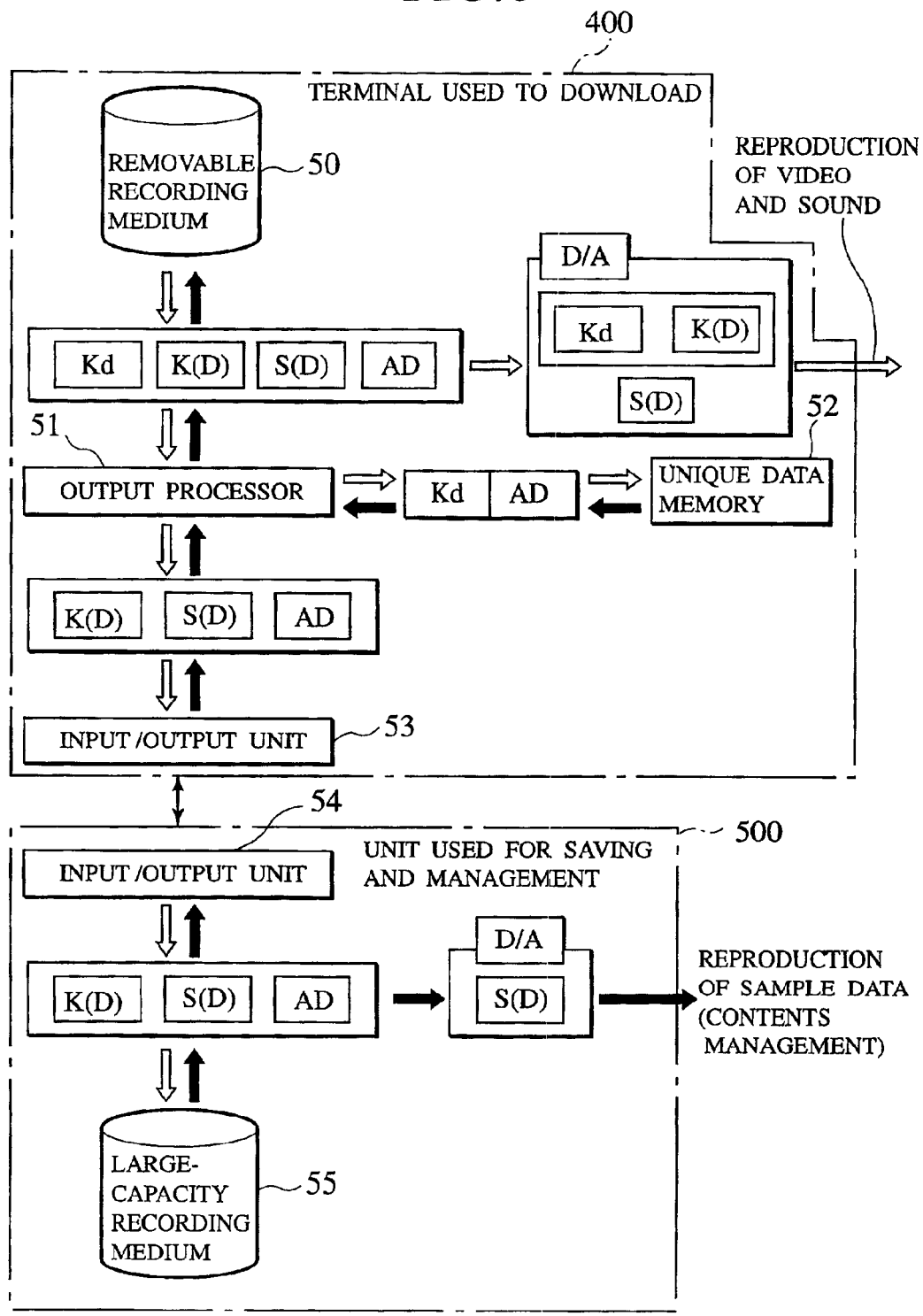
FIG. 6 is a diagram showing how copyrighted digital data is used indirectly in user terminal A.

FIG. 6 shows how digital data, obtained by user terminal A from the contents provider 100, is moved to some other recording medium for saving and management and how that digital data is returned to the original recording medium and terminal for playback.

A removable recording medium 50 of a portable data terminal 400 records therein digital data downloaded from the contents provider 100.

The recorded digital data comprises enciphered copyrighted digital data K(D), decryption key data Kd, digital sample preview data S(D), and additional data AD.

This digital data is moved to another unit 500 in user terminal A for saving and managing. The unit 500 used for saving and management is a PC (personal computer) containing a large-capacity recording medium 55 such as a hard disk or an optical disc. Data output from the terminal 400 comprises the enciphered copyrighted digital data K(D), digital sample preview data S(D), and additional data AD.

At this time, the decryption key data Kd and the corresponding additional data AD are recorded on a unique data recording memory 52.

The unit 500, which receives digital data from the terminal 400 for saving and management, records the enciphered copyrighted digital data K(D), digital sample preview data S(D), and additional data AD on a large-capacity recording medium 55.

Other enciphered copyrighted digital data is also stored in the large-capacity recording medium 55. User terminal A manages copyrighted digital data K(D) using the digital sample data S(D).

The digital sample preview data S(D) is a part of the copyrighted digital data D or a version of the copyrighted digital data D whose video and sound quality is degraded. The digital sample preview data S(D), which is not enciphered, may be D/A-converted and then reproduced.

When the user at user terminal A returns the digital data from the saving/management unit 500 to the terminal 400, the digital data is once recorded on the removable recording medium 50. If the decryption key data Kd is not included in the digital data when the digital data is recorded on the medium, a unique data recording memory 52 is searched for the decryption key data Kd. The corresponding decryption key data Kd, if stored, is read and is recorded on the removable recording medium 50 with other digital data.

The decryption key data Kd, if not stored in the unique data memory 52, may be downloaded from the contents provider 100. If the contents provider 100 has already charged the user using the user data, the contents provider 100 does not change the user any more and allows the user to download and output the decryption key data Kd.

Next, a modification of the copyrighted digital data management method, contents provider, user terminal, and data recording medium according to the present invention will be described briefly with reference to FIG. 7.

Figure 7:
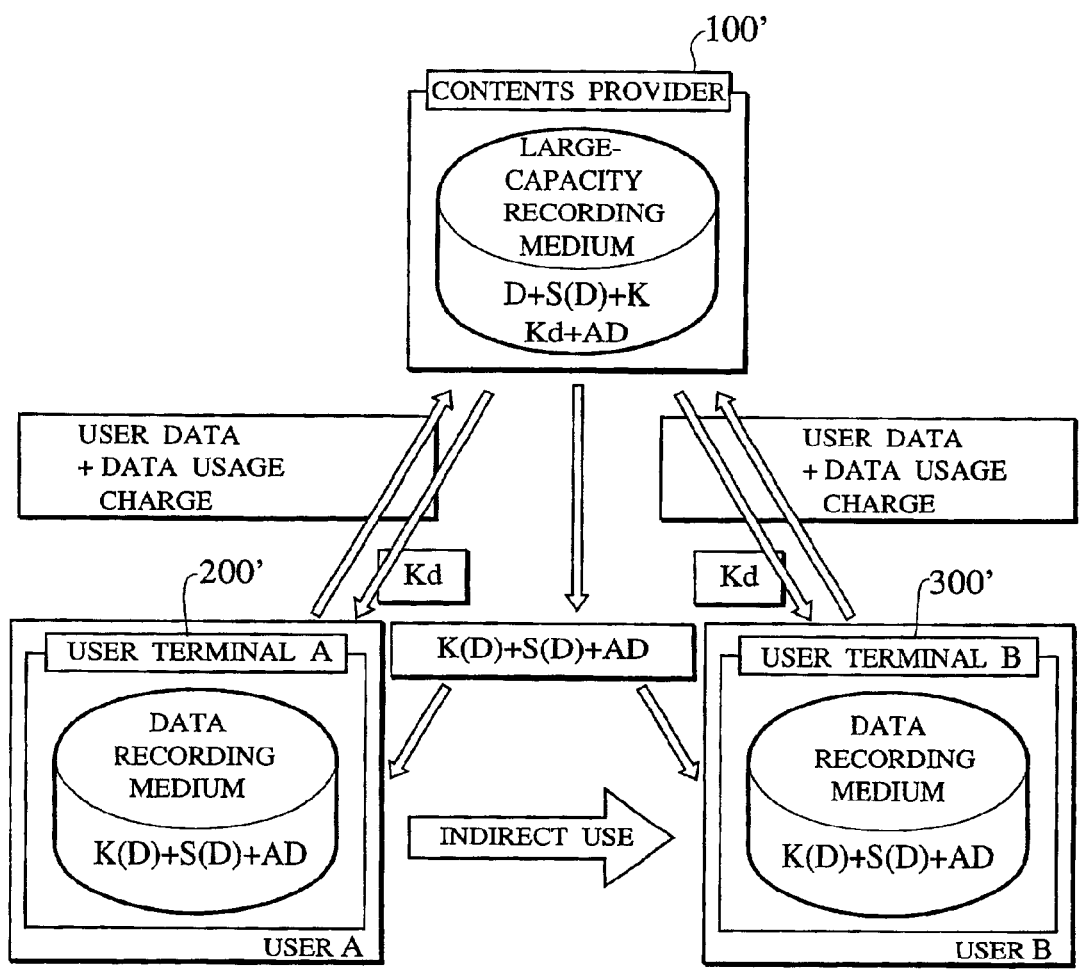
FIG. 7 is a diagram conceptually showing a modification of the copyrighted digital data management method, contents provider, user terminals, and data recording media according to the present invention.

In the modification of the copyrighted digital data management method, contents provider, user terminal, and data recording medium according to the present invention, shown in FIG. 7, the copyrighted digital data D is downloaded from the contents provider 100', a data provider, to a plurality of user terminals 200', 300', such as user terminal A and user terminal B, as in direct mail advertisement. In this case, the technical concept of indirect use of data described above may be applied.

That is, enciphered copyrighted digital data K(D) generated by enciphering the copyrighted digital data D chargeable by the contents provider 100' using the encryption key data K, digital sample preview data S(D) generated from the outline of the copyrighted digital data at a non-chargeable level without enciphering, and additional data AD required for accounting are transmitted from the contents provider 100' to a plurality of user terminals over the network. The user at each user terminal views the digital sample preview data S(D). If the user wants to decipher the enciphered copyrighted digital data K(D), he or she executes the data usage accounting procedure for the contents provider 100'. Then, the decryption key data Kd required for deciphering the enciphered copyrighted digital data K(D) is transmitted from the contents provider 100' to each user terminal 200', 300' over the network to allow the user to legally decipher the enciphered copyrighted digital data K(D) using the decryption key data Kd. On the other hand, the contents provider 100' can prevent the illegal copy of copyrighted digital data.

Of course, the user terminals may copy the enciphered copyrighted digital data K(D), digital sample preview data S(D), and additional data AD among themselves. Even in this case, the user at each terminal may request the contents provider to transmit the decryption key data Kd.

In the method according to the present invention, when the user at a first-level user terminal wants to download copyrighted digital data from the contents provider which is a data provider, the user at the user terminal executes the data usage accounting procedure for the contents provider. Then, the enciphered copyrighted digital data generated by enciphering the chargeable copyrighted digital data using the encryption key data, digital sample preview data generated from the outline of the copyrighted digital data at a non-chargeable level without enciphering, decryption key data for deciphering the copyrighted digital data, and additional data required for accounting are transmitted from the contents provider to the user terminal over the network. This enables the user terminal to legally decipher the enciphered copyrighted digital data using the decryption key data.

In addition, when digital data recorded on a data recording medium in a first user terminal, which is a first-level user terminal of the contents provider, is copied over the network to a second user terminal which is a second-level user, enciphered copyrighted digital data, digital sample preview data, and additional data are transmitted over the network to the second user terminal. The user at the second-level user terminal views the digital sample preview data. If the user at the second-level user terminal wants to decipher the enciphered copyrighted digital data, the user executes the data usage accounting procedure for the contents provider. Then, decryption key data required for deciphering the enciphered copyrighted digital data is transmitted to the second-level user terminal over the network to allow the user to legally decipher the enciphered copyrighted digital data using the decryption key data. This prevents the user at the second user terminal from obtaining unwanted data incorrectly and being charged for it. On the other hand, the contents provider which is a data provider can prevent the illegal copy of copyrighted digital data. In addition, allowing a non-chargeable sample to be made available during the indirect use of copyrighted digital data enables the contents provider to extensively distribute the provided data and to charge the user reliably.

Furthermore, when the copyrighted digital data is downloaded from the contents provider, which is a data provider, to a plurality of user terminals as in direct mail advertisement, the technical concept of the indirect use of copyrighted digital data described above may be applied. That is, enciphered copyrighted digital data generated by enciphering the copyrighted digital data chargeable by the contents provider using the encryption key data, digital sample preview data generated from the outline of the copyrighted digital data at a non-chargeable level without enciphering, and additional data required for accounting are transmitted from the contents provider to a plurality of user terminals over the network. The user at each user terminal views the digital sample preview data. If the user wants to decipher the enciphered copyrighted digital data, he or she executes the data usage accounting procedure for the contents provider. Then, the decryption key data required for deciphering the enciphered copyrighted digital data is transmitted to each user terminal over the network to allow the user to legally decipher the enciphered copyrighted digital data using the decryption key data. On the other hand, the contents provider can prevent the illegal copy of copyrighted digital data.

It should be understood that many modifications and adaptations of the invention will become apparent to those skilled in the art and it is intended to encompass such obvious modifications and changes in the scope of the claims appended hereto.

What is claimed is:

1. A copyrighted digital data management method for a network system in which first and second user terminals are connected to a contents provider via a network and are connected to each other via the network or a leased line, the method comprising the steps of:

transmitting a request for using copyrighted digital data from said first user terminal to said contents provider;

executing a data usage accounting procedure between said first user terminal and said contents provider;

transmitting enciphered copyrighted digital data generated by enciphering the copyrighted digital data using encryption key data, decryption key data for deciphering the enciphered copyrighted digital data, digital sample preview data which is generated from an outline of the copyrighted digital data at a non-chargeable level without enciphering and is reproducible without the decryption key data, and additional data required for accounting from said contents provider to said first user terminal;

receiving those data by said first user terminal and recording those data on a data recording medium, therein; and transmitting the enciphered copyrighted digital data, the digital sample preview data, and the additional data without transmitting the decryption key data from said first user terminal to said second user terminal.

2. The copyrighted digital data management method according to claim 1, further comprising the steps of:

acquiring information on said contents provider based on the additional data received from said first user terminal by said second user terminal;

executing the data usage accounting procedure between said second user terminal and said contents provider;

transmitting from said contents provider to said second user terminal, the decryption key data for deciphering the enciphered copyrighted digital data received from said first user terminal.

3. The copyrighted digital data management method according to claim 2 further comprising the steps of:

deciphering the enciphered copyrighted digital data received from said contents provider with the decryption key data received from said contents provider by said first user terminal and;

deciphering the enciphered copyrighted digital data received from said first user terminal with the decryption key data received from said contents provide by said second user terminal.

4. A contents provider connected to first and second user terminals via a network, comprising:

receiving means for receiving a request for using copyrighted digital data and a data usage accounting procedure from said first and second user terminals; and transmitting means for transmitting enciphered copyrighted digital data generated by enciphering the copyrighted digital data using encryption key data, decryption key data for deciphering the enciphered copyrighted digital data, digital sample preview data which is generated from an outline of the copyrighted digital data at a non-chargeable level without enciphering and is reproducible without the decryption key data, and additional data required for accounting to said first user terminal after said receiving means receives the data usage accounting procedure from said first user terminal, and transmitting the decryption key data to said second user terminal when said receiving means receives the data usage accounting procedure based on the additional data from said second user terminal.

5. A user terminal connected to a contents provider via a network and connected to another user terminal via the network or a leased line, comprising:

transmitting means for transmitting a request for using copyrighted digital data and a data usage accounting procedure to said contents provider;

receiving means for receiving enciphered copyrighted digital data generated by enciphering the copyrighted digital data using encryption key data, decryption key data for deciphering the enciphered copyrighted digital data, digital sample preview data which is generated from an outline of the copyrighted digital data at a non-chargeable level without enciphering and is reproducible without the decryption key data, and additional data required for accounting, from said contents provider after said transmitting means transmits the accounting procedure to said contents provider;

recording means for recording in a data recording medium the enciphered copyrighted digital data, digital sample preview data, decryption key data, and additional data received by said receiving means;

reproducing means for reproducing the digital sample preview data recorded in said data recording medium; and deciphering means for deciphering the enciphered copyrighted digital data recorded in said data recording medium;

wherein said transmitting means transmits the enciphered copyrighted digital data, the digital sample preview data, and the additional data recorded in said recording medium without transmitting the decryption key data recorder therein to the other user terminal.

* * * * *